United States Patent [19]

Hirdler

[11] 3,896,213

[45] July 22, 1975

[54] PROCESS FOR DISPOSING OF OFF-GASES CONTAINING CARBON DIOXIDE AND CHLORINE

[75] Inventor: Louis C. Hirdler, Lake Charles, La.

[73] Assignee: Olin Corporation, New Haven, Conn.

[22] Filed: July 5, 1973

[21] Appl. No.: 376,491

[52] U.S. Cl. ............... 423/232; 423/241; 423/424; 423/431; 423/473; 423/499; 260/248 C
[51] Int. Cl. .......... B01d 53/34; C01b ; C07d 55/36
[58] Field of Search .......... 423/473, 210, 220, 232, 423/240, 241, 499, 424, 429, 191, 431, 422; 260/248 C

[56] References Cited
UNITED STATES PATENTS

| | | | |
|---|---|---|---|
| 972,954 | 10/1910 | Walker | 423/473 |
| 1,500,126 | 7/1924 | Hanson et al. | 423/499 X |
| 1,632,483 | 6/1927 | MacMullin | 423/473 |
| 3,023,076 | 2/1962 | Karwat | 423/235 |
| 3,712,891 | 1/1973 | Berkowitz et al. | 260/248 C |
| 3,835,134 | 9/1974 | Schiessel et al. | 260/248 C |
| 3,835,135 | 9/1974 | Sawhill | 260/248 C |
| 3,835,136 | 9/1974 | Hirdler et al. | 260/248 C |
| 3,846,424 | 10/1974 | Hirdler et al. | 260/248 C |

FOREIGN PATENTS OR APPLICATIONS

| | | | |
|---|---|---|---|
| 708,890 | 5/1964 | Canada | 423/235 |

*Primary Examiner*—Earl C. Thomas
*Attorney, Agent, or Firm*—James B. Haglind; Donald F. Clements; Thomas P. O'Day

[57] ABSTRACT

A process is described for disposing of off-gases comprised of a gaseous mixture of chlorine and carbon dioxide such as off-gases produced in hypochlorous acid generators. The off-gases are reacted with an aqueous solution of an alkaline compound and a reducing agent to produce a substantially neutral aqueous solution containing alkali metal salts which can be safely discarded.

This disposal process can be used, for example, in a cyclic process for the production of chloroisocyanuric acids by the reaction of hypochlorous acid with cyanuric acid, an alkali metal cyanurate or an alkaline earth metal cyanurate, where chlorine containing carbon dioxide is used to generate the hypochlorous acid.

20 Claims, No Drawings

PROCESS FOR DISPOSING OF OFF-GASES CONTAINING CARBON DIOXIDE AND CHLORINE

This invention relates to a process for the disposal of off-gases obtained in the production of hypochlorous acid. Hypochlorous acid is a well-known chlorinating agent, used, for example, in the production of bleaching agents.

It is known to produce hypochlorous acid by the reaction of an aqueous solution of an alkali metal hydroxide with chlorine gas. In this method, an alkali metal hypochlorite solution is first formed, which upon further chlorination produces a solution containing hypochlorous acid. Frequently the chlorine gas used as the chlorinating agent is mixed with other gases such as carbon dioxide or air. When carbon dioxide is present with the chlorine in the reaction with the alkali metal hydroxide solution, the initial reaction gives a solution containing an alkali metal hypochlorite, an alkali metal chloride and an alkali metal carbonate. This solution upon further chlorination in a second stage produces hypochlorous acid and regenerates carbon dioxide. Part of the carbon dioxide formed is dissolved in the hypochlorous acid solution produced and the remainder is in the form of a gaseous mixture with chlorine. The hypochlorous acid solution can then be used in a chlorination process, for example, as described in U.S. Pat. No. 3,712,891, issued Jan. 23, 1973 for the chlorination of cyanuric acid to form dichloroisocyanuric acid and trichloroisocyanuric acid. During the chlorination reaction of hypochlorous acid and cyanuric acid, gaseous by-products such as nitrogen trichloride and carbon dioxide are formed. If permitted to accumulate in the chlorination reactor, nitrogen trichloride could reach a concentration where it would present an explosion hazard. It is therefore necessary to remove the gaseous by-products formed. A particularly suitable method is the use of a chlorine-containing gas such as gaseous chlorine to continuously sweep out the gaseous by-products including carbon dioxide and nitrogen trichloride. The chlorine-containing gas containing these gaseous by-products is then used to generate hypochlorous acid, as described above. As the amount of carbon dioxide present in the chlorine-containing gas increases, more of the alkali metal hydroxide reacts to form alkali metal carbonate. Thus, less alkali metal hypochlorite is produced and the efficiency of the hypochlorous acid generator is reduced.

There is a need at the present time for utilizing impure chlorine gases containing carbon dioxide in the production of hypochlorous acid while preventing an excessive buildup of carbon dioxide. The disposing of the excess carbon dioxide should be carried out in such a manner that the loss of chlorine with which it is mixed is minimal.

It is an object of the present invention to provide a method for the production of hypochlorous acid using chlorine gas containing contaminants such as carbon dioxide while preventing an excessive build-up of the contaminants.

Another object of the present invention is to provide a method of disposing of off-gases comprised of a mixture of carbon dioxide and chlorine in a manner which avoids the pollution of natural resources.

These and other objects of the invention will be apparent from the following detailed description of the invention.

Briefly, in the process of the present invention off-gases comprised of a gaseous mixture of carbon dioxide and chlorine are disposed of by reacting the gaseous mixture with an alkaline compound selected from the groups consisting of alkali metal hydroxides, alkali metal carbonates, alkaline earth metal hydroxides and alkaline earth metal carbonates in the presence of a reducing agent. A substantially neutral aqueous solution containing an alkaline bicarbonate and an alkaline chloride is formed.

More in detail, off-gases comprised of a gaseous mixture of chlorine and carbon dioxide containing from about 0.1 to about 50 percent and preferably from about 1 to about 40 percent by volume of chlorine are treated by the process of this invention. The gaseous mixture may also contain inert gases such as air or nitrogen in varying proportions. The gaseous mixture may be formed during a chlorination reaction, such as in the generation of hypochlorous acid or it may be obtained, for example, during the purification or drying of a chlorine-containing product or the treatment process for a chlorine-containing waste material, where gases such as air or carbon dioxide are used to recover the chlorine present.

The alkaline compound used is selected, for example, from the group consisting of alkali metal hydroxides, alkali metal carbonates, alkaline earth metal hydroxides and alkaline earth metal carbonates. Suitable alkali metal hydroxides include sodium hydroxide, potassium hydroxide or lithium hydroxide. Alkali metal carbonates which can be employed include those of sodium carbonate, potassium carbonate or lithium carbonate. Alkaline earth metal hydroxides which can be used in the process of this invention include calcium hydroxide or magnesium hydroxide. Suitable alkaline earth metal carbonates are those of calcium carbonates and magnesium carbonate. In order to simplify the disclosure of the invention it will be described hereinafter in terms of alkali metal hydroxides, which are the preferred alkaline compounds. However, those skilled in the art will recognize that any of the above-mentioned alkali metal carbonates, alkaline earth metal hydroxides or alkaline earth metal carbonates may be used as a substitute or partial replacement for the alkali metal hydroxides. Of the alkali metal hydroxides, sodium hydroxide is a most preferred embodiment.

The proportion of alkali metal hydroxide present in the aqueous solution ranges from about 0.5 to about 60 and preferably from about 3 to about 20 percent by weight of alkali metal hydroxide. Sufficient proportions of aqueous solution-containing alkali metal hydroxide are used to react with the carbon dioxide present in the off-gases to form an alkali metal bicarbonate and to react with the chloride ion present to form an alkali metal chloride. The pH of the solution obtained ranges from about 5 to about 8 and preferably from about 6.5 to about 7.5.

A reducing agent, for example, selected from the group consisting of sulfur dioxide, alkali metal sulfites, alkali metal bisulfites, alkali metal thiosulfates and alkali metal dithionites can be utilized in the process of this invention. Other reducing agents such as hydrazine or hydrogen peroxide may also be employed if desired. Preferably, sulfur dioxide is used as it is inexpensive and during the reaction forms sodium sulfate which can be readily disposed of in the neutral aqueous solution without producing a pollution problem.

Sufficient reducing agent is contacted with the aqueous solution and off-gases to provide at least the stoichiometric proportion necessary to reduce the chlorine present to the chloride ion.

The reaction can be carried out at ambient temperatures but higher or lower temperatures may be used, for example, from about 0°C. to about 60°C. The reaction is preferably conducted at atmospheric pressure but pressures greater or lesser than atmospheric may be used if desired.

Following the reaction a neutral solution containing an alkali metal bicarbonate, an alkali metal chloride and an alkali metal salt, formed during the reaction of the reducing agent with the chlorine present, is obtained which can be safely discarded without causing harmful pollution when discharged, for example, to a brackish river.

The method of this invention is particularly suitable for disposing of off-gases produced in hypochlorous acid generators such as those used in the generation of hypochlorous acid for the preparation of polychloroisocyanurates. In those processes, hypochlorous acid can be produced by reacting chlorine with an alkali metal hydroxide in a single stage reactor where the hydroxide solution is chlorinated until hypochlorous acid is produced, generally at a pH of from about 4 to about 5.5 at a temperature of about 0° to about 5°C. However, because of the poor stability of hypochlorous acid, it is preferred to use a two-stage process. In the first stage, chlorine, which usually contains at least a portion of recycled chlorine, reacts with the alkali metal hydroxide solution to form an alkali metal hypochlorite solution containing an alkali metal chloride. When carbon dioxide is present in the chlorine reactant, as is generally the case in the recycle portion, it reacts with the hydroxide to form an alkali metal carbonate which remains dissolved in the resulting alkali metal hypochlorite solution. This solution can be stored until required for the second stage, which is the further chlorination of the alkali metal hypochlorite solution to produce hypochlorous acid. The alkali metal carbonate present also reacts with chlorine to release gaseous carbon dioxide, which generally passes off of the solution as a gaseous mixture with unreacted chlorine. The resulting gaseous mixture is then reacted with an alkali metal hydroxide and a reducing agent as described above.

The process of the present invention is applicable, for example, in the treatment of a gaseous mixture of carbon dioxide and chlorine obtained during the production of hypochlorous acid used, for example, in a continuous process for the production of a polychloroisocyanuric acid such as di- or trichloroisocyanuric acid. The process reacts an aqueous slurry of a cyanuric compound selected from the group consisting of cyanuric acid, alkali metal cyanurate and alkaline earth metal cyanurate, in a first reactor with hypochlorous acid and a chlorine-containing compound selected from the group consisting of chlorine and chlorine octahydrate to form a reaction slurry containing the chloroisocyanuric acid. The amount of chlorine-containing compound fed to the reaction slurry is in excess of the stoichiometric amount required to react with the cyanuric compound. For example, when the cyanuric acid compound used is a monoalkali metal cyanurate, the proportion of chlorine containing compound used is equivalent to a molar ratio of chlorine-containing compound to monoalkali metal cyanurate of at least about 1.01:1, and preferably from about 1.01:1 to about 5:1. The temperature in the reaction slurry is maintained at from about 10° to about 25°C. and a pH of the reaction slurry of from about 3 to about 4.5.

The excess of chlorine-containing compound is used to remove gaseous by-products comprising carbon dioxide and nitrogen trichloride formed during the reaction between the monoalkali metal cyanurate, the hypochlorous acid and the chlorine-containing compound to produce trichloroisocyanuric acid.

This excess of chlorine-containing compound containing gaseous by-products comprising carbon dioxide and nitrogen trichloride is conveyed to a second reactor. Nitrogen trichloride is decomposed to form nitrogen and chlorine and all of the chlorine present reacts with an aqueous alkali metal hydroxide solution to form an aqueous solution containing an alkali metal hypochlorite. The carbon dioxide present reacts with the alkali metal hydroxide to form an alkali metal carbonate which dissolves in the alkali metal hypochlorite solution.

The aqueous solution containing an alkali metal hypochlorite and an alkali metal carbonate is reacted with additional chlorine to produce hypochlorous acid and off-gases comprised of a mixture of carbon dioxide and chlorine. The off-gases are then reacted with an aqueous solution of a second alkali metal hydroxide in the presence of a reducing agent to form an aqueous solution containing an alkali metal bicarbonate and an alkali metal chloride.

The process of the present invention is further illustrated by the following example. All percentages are by weight unless otherwise specified.

EXAMPLE

In a process for the production of trichloroisocyanuric acid by the reaction of monosodium cyanurate with hypochlorous acid and chlorine gas in a chlorination reactor, an excess of 826 parts chlorine was fed to the chlorination reactor to remove carbon dioxide and nitrogen trichloride formed during the reaction. This excess chlorine-containing 12 parts of carbon dioxide and 43 parts of nitrogen trichloride was added to an absorption vessel containing a solution of 1,488 parts of sodium hydroxide in 37,162 parts of water at 25°C. Also added to the absorption vessel was a gas stream containing 396 parts of chlorine, 17 parts of carbon dioxide and 36,381 parts of air obtained from a product purification step. The chlorine and nitrogen trichloride present reacted with sodium hydroxide solution to form a solution containing 1,322 parts of sodium hypochlorite, 1,038 parts of sodium chloride and 15 parts of NaOH in 37,494 parts of water. The carbon dioxide reacted with sodium hydroxide solution to form 70 parts of sodium carbonate which remains in the same solution. The solution mixture containing sodium hypochlorite, sodium chloride, and sodium carbonate was cooled to 0°C. and transferred to a hypochlorous acid generator. 1,538 parts of chlorine were added to the generator and reacted with the sodium hypochlorite and the sodium carbonate present to form a solution having a pH of about 5 containing 1,951 parts of hypochlorous acid and 2,175 parts of NaCl in 37,163 parts of water. In the reaction of sodium carbonate with chlorine, 29 parts of carbon dioxide were released which formed a gaseous mixture containing 30 parts of chlorine, the chlorine constituting 39.1 percent by volume of the gaseous mixture. The temperature of the hypochlorous acid generator was maintained at 2°C. during HOCl formation. The hypochlorous acid solution containing sodium chloride was supplied to the chlorination reactor for the production of trichloroisocyanuric acid.

The gaseous mixture of chlorine and carbon dioxide from the hypochlorous acid generator was conveyed to a neutralizing vessel containing a solution of 94 parts of sodium hydroxide in 1,470 parts of water. Sulfur dioxide gas (27 parts) was added and a neutral solution containing 55 parts of sodium bicarbonate, 60 parts of sodium sulfate and 50 parts of sodium chloride was obtained and discharged to a brackish river.

What is claimed is:

1. The process for disposing of off-gases comprised of a gaseous mixture of carbon dioxide and chlorine which comprises reacting said gaseous mixture containing from about 0.1 to about 50 percent by volume of chlorine with an aqueous solution of an alkaline compound selected from the group consisting of alkali metal hydroxides, alkali metal carbonates, alkaline earth metal hydroxides and alkaline earth metal carbonates in the presence of a reducing agent to form a substantially neutral aqueous solution containing an alkaline bicarbonate and an alkaline chloride.

2. The process of claim 1 in which said alkaline compound is an alkali metal hydroxide selected from the group consisting of sodium hydroxide, potassium hydroxide or lithium hydroxide.

3. The process of claim 1 in which said reducing agent is selected from the group consisting of sulfur dioxide, alkali metal sulfites, alkali metal bisulfites, alkali metal thiosulfates and alkali metal dithionites.

4. The process of claim 2 in which said alkali metal hydroxide is sodium hydroxide.

5. The process of claim 4 in which said reducing agent is sulfur dioxide.

6. In a process for producing hypochlorous acid by the reaction of an aqueous solution containing an alkali metal hypochlorite, an alkali metal carbonate, and an alkali metal chloride with a chlorine containing compound to form an aqueous solution of hypochlorous acid and a gaseous mixture of carbon dioxide and chlorine, the improvement which comprises reacting said gaseous mixture containing from about 0.1 to about 50 percent by volume of chlorine with an aqueous solution of an alkaline compound selected from the group consisting of alkali metal hydroxides, alkali metal carbonates, alkaline earth metal hydroxides and alkaline earth metal carbonates in the presence of a reducing agent to produce a substantially neutral aqueous solution of an alkaline bicarbonate and an alkaline chloride.

7. The process of claim 6 in which said alkali metal hypochlorite is selected from the group consisting of sodium hypochlorite, potassium hypochlorite or lithium hypochlorite.

8. The process of claim 7 in which said alkali metal hypochlorite is sodium hypochlorite.

9. The process of claim 8 in which said alkaline compound in an alkali metal hydroxide selected from the groups consisting of sodium hydroxide, potassium hydroxide and lithium hydroxide.

10. The process of claim 9 in which said alkali metal hydroxide is sodium hydroxide.

11. The process of claim 10 in which said reducing agent is selected from the group consisting of sulfur dioxide, alkali metal sulfites, alkali metal bisulfites, alkali metal thiosulfates and alkali metal dithionites.

12. The process of claim 11 in which said reducing agent is sulfur dioxide.

13. The process of claim 12 in which said reaction of said gaseous mixture with said sodium hydroxide in the presence of said sulfur dioxide takes place at a temperature of from about 0° to about 60°C.

14. The process of claim 13 in which said gaseous mixture contains from about 1 to about 40 percent by volume of chlorine.

15. A continuous process for preparing a polychloroisocyanuric acid selected from the group consisting of dichloroisocyanuric acid and trichloroisocyanuric acids which comprises:

a. reacting an aqueous slurry of a cyanuric compound selected from the group consisting of cyanuric acid, alkali metal cyanurates, and alkaline earth metal cyanurates in a first reactor with hypochlorous acid and chlorine to form a reaction slurry containing polychloroisocyanuric acid and gaseous by-products comprising carbon dioxide and nitrogen trichloride wherein the proportion of said chlorine fed to said reaction slurry is in excess of the stoichiometric amount required to react with said cyanuric compound, b. using said excess of said chlorine to remove said gaseous by-products formed during said reaction, c. reacting said excess chlorine containing gaseous by-products comprising said carbon dioxide and said nitrogen trichloride in a second reactor with a first aqueous solution of an alkali metal hydroxide to decompose said nitrogen trichloride to form nitrogen and chlorine to produce an aqueous solution containing an alkali metal hypochlorite and an alkali metal carbonate, d. reacting said-aqueous solution containing an alkali metal hypochlorite and an alkali metal carbonate with chlorine to produce hypochlorous acid and off-gases comprised of a mixture of carbon dioxide and chlorine, wherein said chlorine is present in from about 0.1 to about 50 percent by volume, e. recycling said hypochlorous acid to said first reactor, and f. reacting said off-gases with a second aqueous solution of an alkali metal hydroxide in the presence of a reducing agent to form an aqueous solution containing an alkali metal bicarbonate and an alkali metal chloride.

16. The process of claim 15 in which said first and said second alkali metal hydroxides are sodium hydroxide.

17. The process of claim 16 in which said alkali metal hypochlorite is sodium hypochlorite and said alkali metal carbonate is sodium carbonate.

18. The process of claim 17 in which said reducing agent is sulfur dioxide.

19. The process of claim 18 in which said cyanuric compound is an alkali metal cyanurate.

20. The process of claim 19 in which said alkali metal cyanurate is monosodium cyanurate.

* * * * *